Jan. 17, 1956  LE ROY M. KUBAUGH  2,731,304
LINK FOR ENDLESS TRACK
Filed July 21, 1951  3 Sheets-Sheet 1
Fig. 1.
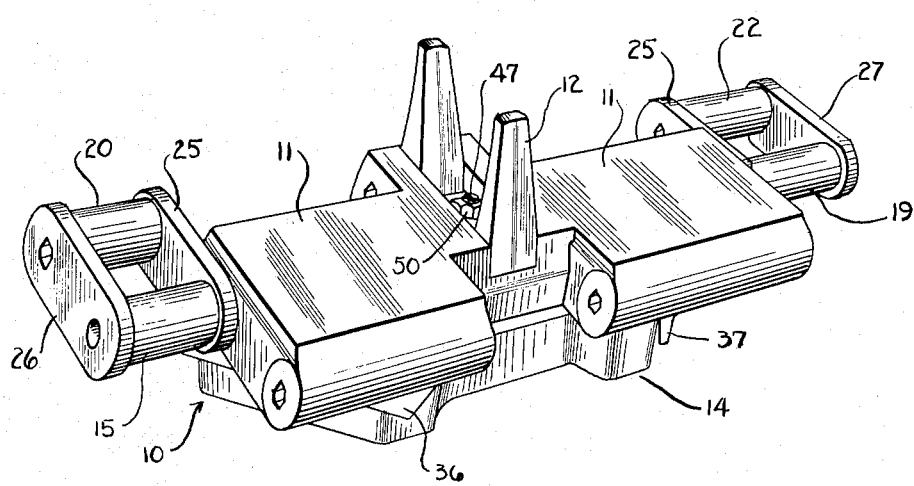
Fig. 6.
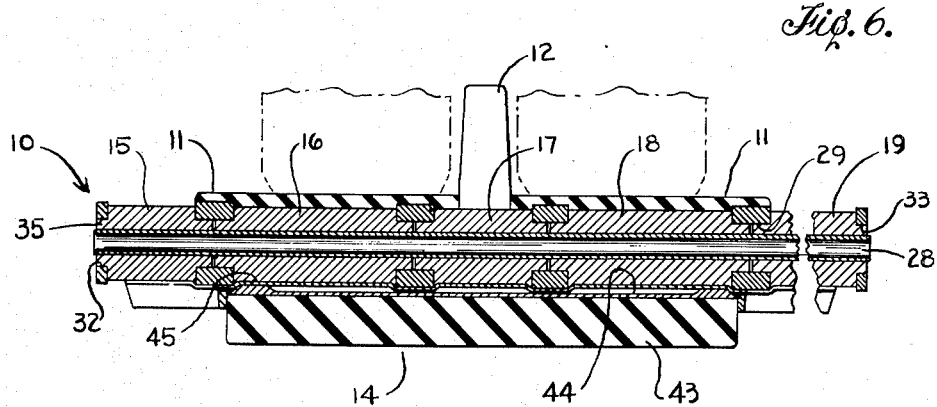
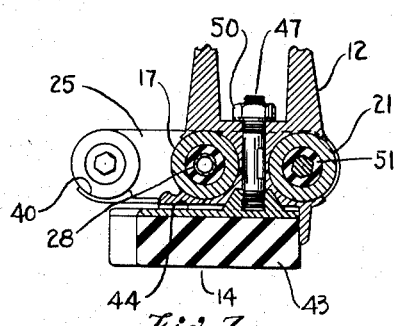
Fig. 7.
INVENTOR.
LEROY M. KUBAUGH
BY
ATTORNEYS Jan. 17, 1956 LE ROY M. KUBAUGH 2,731,304
LINK FOR ENDLESS TRACK
Filed July 21, 1951 3 Sheets-Sheet 2
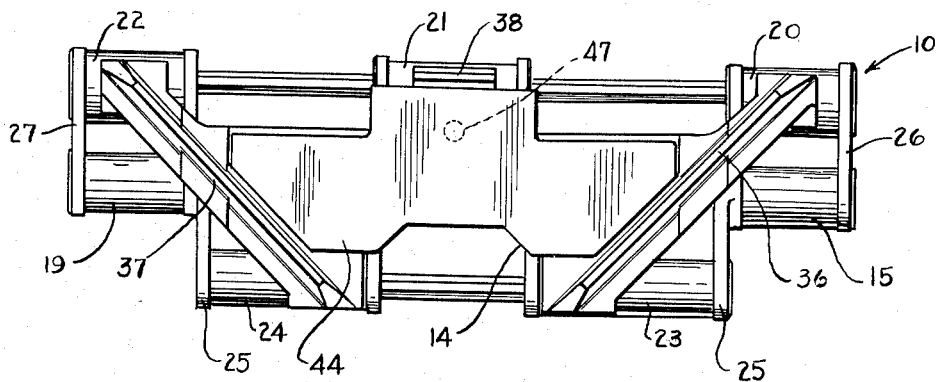
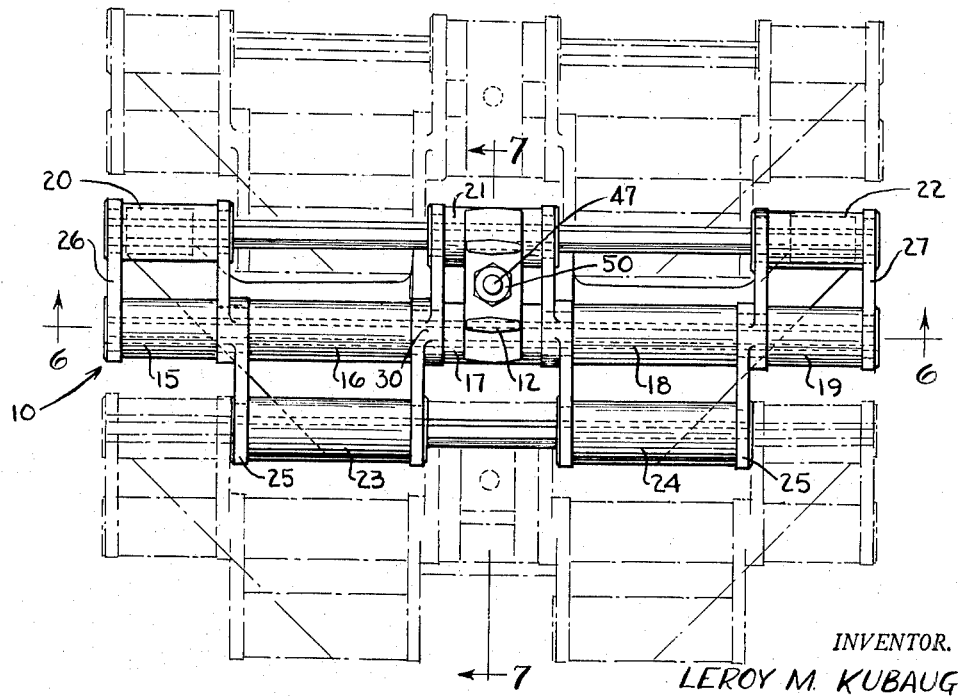
INVENTOR.
LEROY M. KUBAUGH
BY
ATTORNEYS Jan. 17, 1956    LE ROY M. KUBAUGH    2,731,304
LINK FOR ENDLESS TRACK
Filed July 21, 1951                                   3 Sheets-Sheet 3
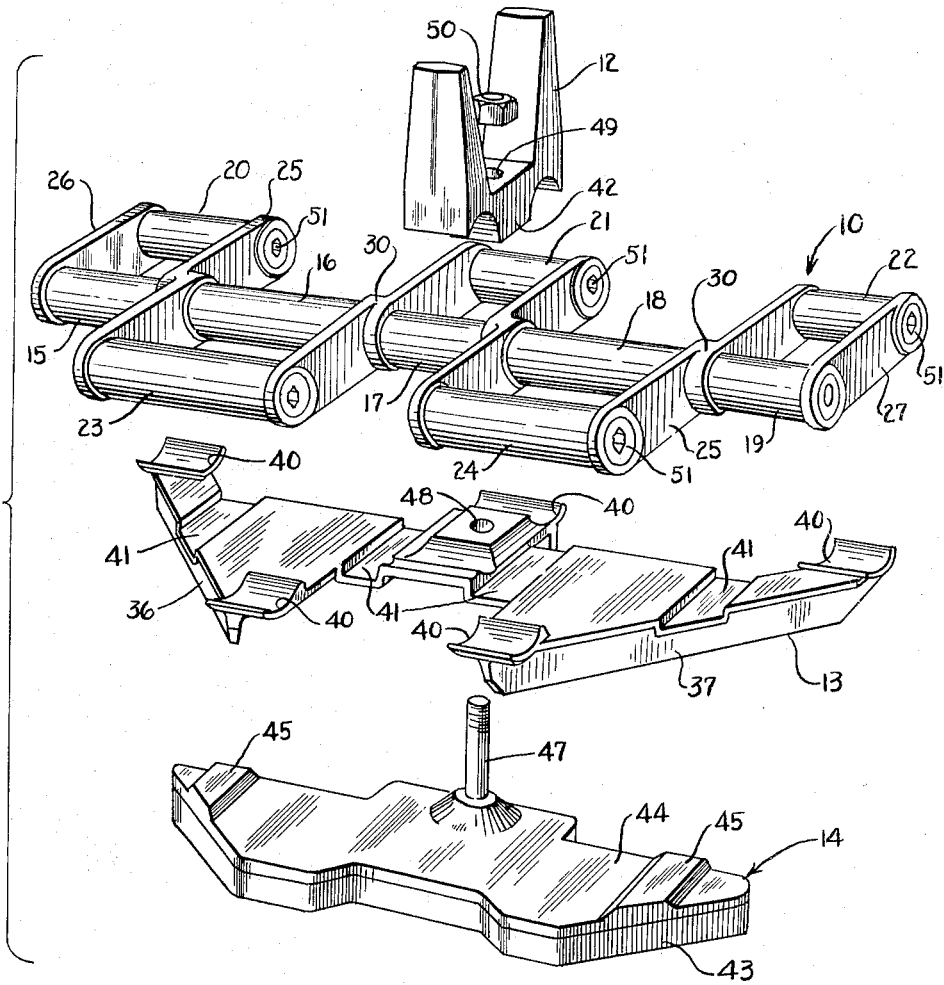
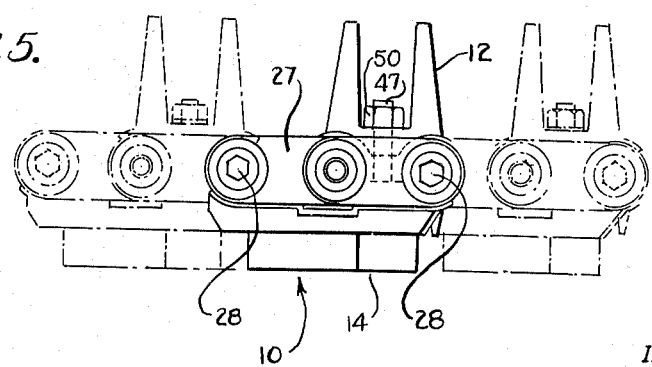
INVENTOR.
LEROY M. KUBAUGH
BY
ATTORNEYS United States Patent Office 2,731,304
Patented Jan. 17, 1956

2,731,304

LINK FOR ENDLESS TRACK

Le Roy M. Kubaugh, Akron, Ohio, assignor to The Firestone Tire & Rubber Company, Akron, Ohio, a corporation of Ohio Application July 21, 1951, Serial No. 237,981

6 Claims. (Cl. 305—10)

This invention relates to endless tracks for track-laying vehicles and more particularly to an improved link suitable for tracks of relatively wide tread.

Heretofore, endless tracks have been small enough to permit their links to be forged in one piece without appreciable difficulty. However when the treads reach the size of, for example, 24 inches and larger, the manufacturing problems of forging such links become almost insurmountable. The forming of such links is essentially a coining operation, and when the overall dimensions reach the size in question, standard equipment is not capable of producing the desired shape. The variation in section thicknesses and wedge shape of many of the parts also present forging difficulties. All of these limitations combined make production of such forged links, if not impossible, at least commercially impractical.

The present invention is directed to meet this problem of manufacture, and in addition to provide an improved track link, by providing an assembly of parts which is easy to manufacture and which has a strength and rigidity matching or exceeding the corresponding properties of a forged link. The improved link is characterized by the assembly of thick walled tubular parts which are joined by connecting members to form a tubular framework of parts which individually are easily forged and/or machined and which can be readily assembled with the other parts. The tubular framework forms a support for the tread portion of the link which contacts the ground and for the track portions which engage the driving sprockets of the track and the bogie wheels of the vehicle. The design is such that it can be easily adapted to meet any requirement as to tread width. Ths link retains all of the advantages of the forged links referred to above and, in addition, has the advantage of ease and economy of manufacture.

It is one of the objects of the invention, therefore, to provide an improved track link which is easy and economical to manufacture.

Another object is to provide a link comprising a plurality of parts which are mutually supporting and which are self-aligning in assembly.

Another object is to provide a link of improved structural strength and rigidity.

Further objects and advantages will be more fully apparent from the following description of the invention, reference being had to the accompanying drawings in which:

Figure 1 is a perspective view of a preferred form of link comprising a metal framework covered by rubber;

Figure 2 is a top plan view of the link of Figure 1, with the rubber removed to show the metal framework, adjacent links being shown in dotted lines to indicate the manner in which the links are connected to form the track;

Figure 3 is a plan view of the link of Figure 2 as viewed from the bottom and showing the tread portions which contact the ground;

Figure 4 is an exploded view of the link with the rubber stripped away showing main parts thereof and indicating the manner of assembly, the parts being shown in perspective as viewed from the top of the link;

Figure 5 is an end view of the link of Figure 2;

Figure 6 is a transverse sectional view of the link of Figure 2 taken as indicated by the lines 6—6 of Figure 2;

Figure 7 is a longitudinal sectional view of the link taken as indicated by the lines 7—7 of Figure 2.

The present invention is shown, by way of example, as comprising a link for an endless track of wide tread, such as is used on heavy military tanks. The link comprises a strong, rigid framework indicated generally at 10, incorporating a hinge structure which enables adjacent links to be connected to form an endless track. Heavy pads 11 of rubber cover the central portions of the link to provide bearing surfaces for the bogie wheels of the vehicle. A guide post member 12 serves to guide and hold the bogie wheels on the pads 11. The framework also provides support for the metal tread plate 13 which is secured to the bottom of the link. If the vehicle is to be used on paved roads, a rubber shoe indicated generally at 14 may be attached to the link.

The framework 10 consists essentially of a central laterally extending backbone member consisting of the aligned sleeves 15—19 and the hinge sections comprising the sleeves 20—22 positioned on one side of the backbone and the sleeves 23—24 positioned on the other side of the backbone. These sleeves are joined together by the longitudinally extending members 25 and by the end members 26 and 27 as shown.

Sleeves 20, 21 and 22 are so spaced as to receive between them the sleeves 23 and 24 of the next adjacent link in the manner of a hinge, with the sleeves having their bores so aligned as to receive the hinge pins or rods 28 which connect adjacent links of the track as will be described in more detail later.

The intermediate connecting members 25 are identical in construction being bored as at 29, see Figure 6, to receive the ends of the assembled sleeves. The members are laterally offset as indicated at 30 to enable assembly of the hinge parts and incidentally providing a double thickness at the central portion of the members which must receive the ends of two sleeves and a single thickness at the ends which receive only a single sleeve. The end members 26 and 27 are bored as at 32 and 33 to receive sleeves 15 and 20 and 19 and 22, respectively.

The various sleeves are also similar in design, having reduced ends 35, see Figure 6, which fit snugly into the bores of the intermediate and end members.

The tubular framework, as assembled, provides support for the tread plate 13 which is forged to shape by a conventional forging operation, machined where necessary, and then hardened to enable it to withstand the abrasion of service. To provide the desired traction, the bottom of the tread plate is positioned with the diagonal grousers 36 and 37 and the central grouser 38. The upper surface of the plate is provided with cylindrical seats 40 which contact the sleeves 17 and 20—24, respectively, the seats having an area of contact sufficient to enable the tread plate to be securely joined to the framework.

It will be noted that the tread plate 13 is provided with offset depressed portions 41 which bridge over the intermediate connecting members. This feature keeps the plate from contact with the connecting members, eliminating any danger of the connecting members lifting the seats out of contact with the sleeves. This makes it possible to eliminate machining of the surfaces of the connecting and the tread plate members. These offset portions, in addition, impart a greater measure of rigidity to the tread plate.

The tread plate 13 not only has the function of providing the tread portion of the link, but also acts as a compound strut to lend stiffness and strength to the link. This is particularly true of the grousers 36 and 37 which extend diagonally from the ends of the link toward the center of the link, as shown in Figure 3. The grousers are relatively heavy in section and impart stiffness to the assembly, particularly strengthening the link against twisting and warping forces which may be exerted upon the track when the vehicle travels over rough terrain.

To assemble the framework, the sleeves and connecting members are fitted together and, together with the tread plate are held in a suitable jig for assembly by a conventional brazing operation. The tolerances of the parts are such as to enable the parts to fit snugly together so that the brazed joints will have the maximum strength.

The link here described is intended for use with a vehicle having dual bogie wheels which ride over the central portions of the track, the rubber pads 11 being molded around and over the central sleeves to provide a suitable surface for bogie wheels. The bogie wheels are guided by the upwardly projecting guide posts of the member 12, see Figures 2 and 6, the posts being tapered slightly to permit the bogie wheels to wipe into contact with the posts if there should be some slight misalignment of the parts. The two posts are spaced a substantial distance apart as shown in Figure 2 so as to guide the bogie wheels more effectively. The post member 12 is an integral forged piece having a lug portion 42 which extends between the sleeves 17 and 21 and fits snugly against them.

When the vehicle is driven over paved roads, the track is usually provided with a rubber shoe 14 secured to the tread plate 13 so that its grousers will not damage the road. Such a shoe takes the form of a block of rubber 43 bonded to a metal plate 44 which fits upon the tread plate in the manner indicated in Figure 3, the plate 44 being seated between the grousers 36 and 37 and the central grouser 38 which act as seats to position the shoe against the tread plate. The top of plate 44 may be provided with lugs 45 which fit against the portions 41 in the tread plate to hold the shoe more securely in place. The shoe may be secured to the tread plate in any convenient manner, but preferably the arrangement is that shown in Figure 7 in which the shoe has an integral threaded stem 47 which extends upwardly through the hole 48 in the tread plate and through the bore 49 of the guide post member 12 to be engaged by nut 50. If the rubber shoe is not used, the guide post member 12 is secured to the link by a conventional nut and bolt arrangement (not shown).

Adjacent links are connected together to form an endless track by means of a hinge arrangement in which the hinge pins or rods 28 are mounted in resilient bushings 51 inserted in the hinge sleeves 20—24 lying on either side of the backbone. The resilient bushings are of the type disclosed in United States Patents Nos. 2,008,772 and 2,049,024 to Robertson to which reference is made for a detailed description of the bushing and the manner of use. Briefly such a bushing comprises a rubber sleeve having a plurality of spaced circumferential enlargements which are considerably larger than the bore in which the bushing is to be inserted, the enlargements being compressed upon insertion of the bushing to grip the walls of the bore with considerable force. In the present example, the bushings 51 have octagonally shaped bores, see Figure 7, to receive in snug fit the correspondingly shaped hinge rods 28. To assemble the track, a plurality of links are brought together with the sleeves 23 and 24 of each link positioned between the sleeves 20, 21, and 22 of adjacent links and in alignment therewith. The hinge rods 28 are then forcibly inserted through the octagonal bores of the aligned bushings to secure the links together.

It will be noted that the octagonal sections of the hinge rods and bushings key the links together so that any relative movement between two of the links takes place not by free rotation of the hinge but through torsional stressing of the bushings.

In driving the track it is desired that the teeth of the sprockets engage and drive through only one sleeve of each of the end pair of sleeves 15 and 20 and 19 and 22, and it is preferred that these be the sleeves 15 and 19 of the backbone. These latter sleeves, accordingly, are hardened, and in some cases may be of heavier wall thickness than the other sleeves comprising the framework. These sleeves are also preferably slightly larger in diameter than their paired sleeves 20 and 22 to ensure that the sprocket teeth will not contact sleeves 20 and 22. The driving forces are thus advantageously applied to the links through the strong central backbone members and not through the articulating axes of the links.

The manner of construction and the interchangeability of the parts, and particularly of many of the sleeves and the connecting members, make the link capable of expansion to a variety of sizes with little or no change in design. The construction further provides the structural strength and rigidity combined with light weight which is desired in such a track link.

A preferred form of the invention has been described by way of example rather than of limitation. It will be apparent that various modifications and changes may be made without departing from the spirit and scope of the invention. For example, the centrally extending sleeves 15—19 may be replaced by a single tube or may, if desired, comprise a solid rod extending through the connecting members. The essential features of the invention are summarized in the appended claims.

What is claimed is:

1. A link for the endless track of a track-laying vehicle comprising a tubular framework including a central backbone member comprising a plurality of coaxially aligned tubular parts extending the full lateral width of the link, said parts being coupled by longitudinally extending members positioned between said parts, a set of tubular hinge parts extending between and secured to alternate pairs of said members on one side of said backbone member and a second set of tubular hinge parts secured to alternate pairs of members on the other side of said backbone member and being staggered with respect to said first set, the sets of said link being adapted to be inserted between and to be aligned with the sets of adjacent links to receive hinge rods extending through said aligned sets to join said links in hinged relationship, a metal tread plate secured to said tubular framework, said tread plate having cylindrical seats fitting snugly against certain of the tubular parts, said plate having diagonally extending grousers acting as struts to reinforce and stiffen the tubular framework.

2. A link for the endless track of a track-laying vehicle comprising a framework including a central backbone member comprising a plurality of hollow aligned parts extending the full lateral width of the link, said parts being coupled by longitudinally extending members positioned between said parts, a set of hinge parts extending between and secured to alternate pairs of said longitudinal members on one side of said backbone member and a second set of complementary hinge parts secured to alternate pairs of longitudinal members on the other side of said backbone member and being staggered with respect to said first set, the sets of said link being adapted to be inserted between and to be aligned with the sets of adjacent links, to receive hinge rods extending through said aligned sets to join said links in hinged relationship, a metal tread plate secured to said framework, said tread plate engaging said first and said second set of hinge parts and said central backbone member, said tread plate having diagonally extending grousers extending between said first and said second set of hinge parts and diagonally intersecting said backbone member whereby to strengthen the link against twisting and warping forces exerted thereupon.

3. A link for the endless track of a track-laying vehicle comprising a framework including a central backbone member comprising a plurality of hollow aligned parts extending the full lateral width of the link, said parts being coupled by longitudinally extending members positioned between said parts, a set of hinge parts extending between and secured to alternate pairs of said longitudinal members on one side of said backbone member and a second set of complementary hinge parts secured to alternate pairs of longitudinal members on the other side of said backbone member and being staggered with respect to said first set, the sets of said link being adapted to be inserted between and to be aligned with the sets of adjacent links, to receive hinge rods extending through said aligned sets to join said links in hinged relationship, a metal tread plate secured to said framework, said tread plate engaging said first and said second set of hinge parts and said central backbone member, said tread plate having at least one diagonally extending grouser extending between said first and said second set of hinge parts and diagonally intersecting said backbone member whereby to strengthen the link against twisting and warping forces exerted thereupon, recesses in said plate substantially complemental to said longitudinal members whereby said tread plate contacts said framework solely at said first and said second set of hinge parts and at said backbone member.

4. A link for the endless track of a track-laying vehicle comprising a framework including a central backbone member comprising a plurality of hollow aligned parts extending the full lateral width of the link, said parts being coupled by longitudinally extending members positioned between said parts, a set of hinge parts extending between and secured to alternate pairs of said longitudinal members on one side of said backbone member and a second set of complementary hinge parts secured to alternate pairs of longitudinal members on the other side of said backbone member and being staggered with respect to said first set, the sets of said link being adapted to be inserted between and to be aligned with the sets of adjacent links, to receive hinge rods extending through said aligned sets to join said links in hinged relationship, a metal tread plate secured to said framework, said tread plate engaging said first and said second set of hinge parts and said central backbone member, said tread plate having a diagonally extending grouser extending between said first and said second set of hinge parts and diagonally intersecting said backbone member whereby to strengthen the link against twisting and warping forces exerted thereupon.

5. A link for the endless track of a track-laying vehicle comprising a framework including a central backbone member comprising a plurality of tubular aligned parts extending the full lateral width of the link, said parts being coupled by longitudinally extending members positioned between said parts, a set of tubular hinge parts extending between and secured to alternate pairs of said longitudinal members on one side of said backbone member and a second set of complementary tubular hinge parts secured to alternate pairs of longitudinal members on the other side of said backbone member and being staggered with respect to said first set, the sets of said link being adapted to be inserted between and to be aligned with the sets of adjacent links, to receive hinge rods extending through said tubular aligned sets to join said links in hinged relationship, a metal tread plate secured to said framework, said tread plate engaging said first and said second set of hinge parts and said central backbone member, said tread plate having at least one diagonally extending grouser extending between said first and said second set of hinge parts and diagonally intersecting said backbone member whereby to strengthen the link against twisting and warping forces exerted thereupon.

6. A link for the endless track of a track-laying vehicle comprising a framework including a central backbone member comprising a plurality of tubular aligned parts extending the full lateral width of the link, said parts being coupled by longitudinally extending members positioned between said parts, a set of tubular hinge parts extending between and secured to alternate pairs of said longitudinal members on one side of said backbone member and a second set of complementary tubular hinge parts secured to alternate pairs of longitudinal members on the other side of said backbone member and being staggered with respect to said first set, the sets of said link being adapted to be inserted between and to be aligned with the sets of adjacent links, to receive hinge rods extending through said tubular aligned sets to join said links in hinged relationship, a metal tread plate secured to said framework, said tread plate engaging said first and said second set of hinge parts and said central backbone member, said tread plate having at least one grouser extending between said first and said second set of hinge parts and intersecting said backbone member whereby to strengthen the link against twisting and warping forces exerted thereupon.

References Cited in the file of this patent

UNITED STATES PATENTS

| Number | Name | Date |
|---|---|---|
| 2,353,124 | Burgess | July 11, 1944 |
| 1,789,814 | George | Jan. 20, 1931 |
| 2,389,438 | Knox | Nov. 20, 1945 |

FOREIGN PATENTS

| Number | Country | Date |
|---|---|---|
| 47,953 | Norway | May 26, 1930 |